United States Patent Office 2,705,702
Patented Apr. 5, 1955

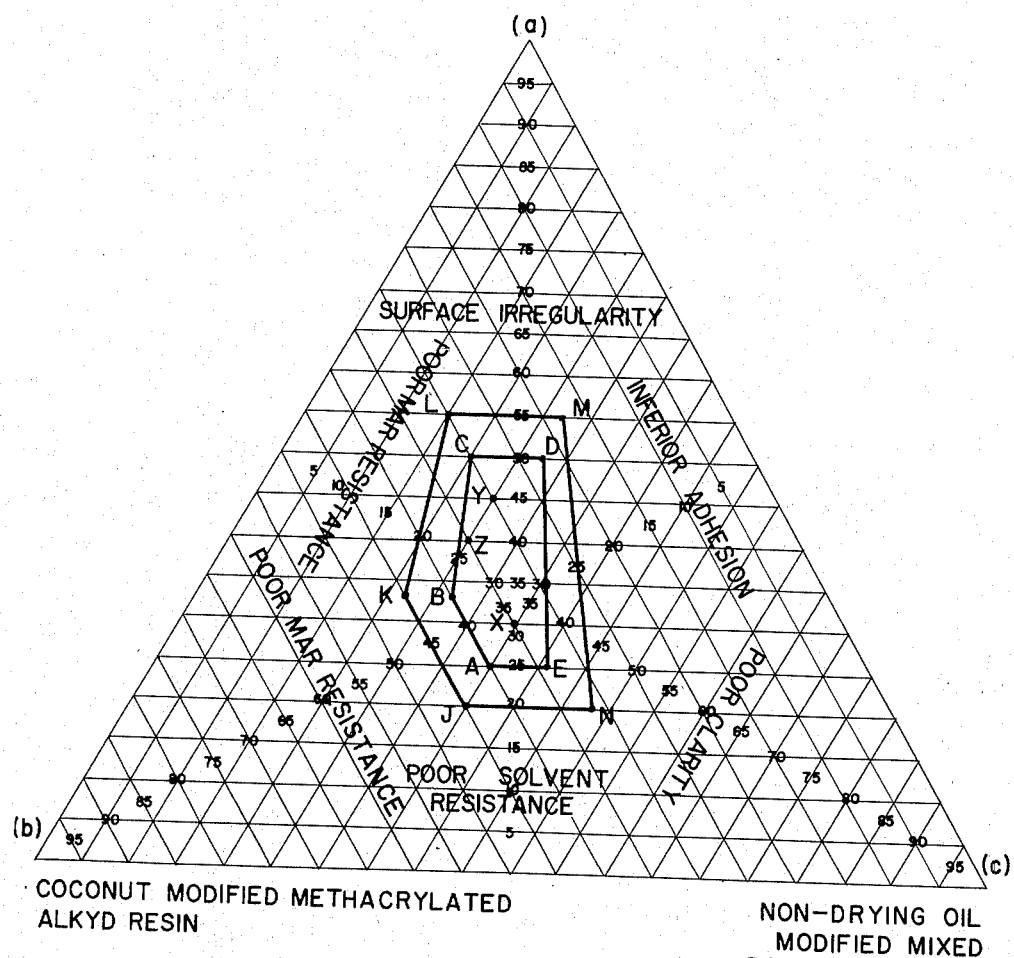

2,705,702

COATING COMPOSITIONS

Robert W. La Berge, Magnolia, N. J., assignor to E. I. du Pont de Nemours and Company, Wilmington, Del., a corporation of Delaware Application November 18, 1952, Serial No. 321,143

16 Claims. (Cl. 260—22)

This invention relates to coating compositions, more particularly to sprayable high non-volatile content coating compositions dispersed in hydrocarbon solvents, and metallic and non-metallic substrate coated therewith.

An ideal liquid coating composition would be one which could be applied at 100% non-volatile content and would be convertible to a solid coating possessing all the desired qualities. The use of liquid polymerizable monomers which are convertible to a solid by heating is a step in the direction of developing such an ideal coating composition. However, polymerizable monomers are low in viscosity and generally do not polymerize sufficiently rapidly to permit application of thick coatings without encountering application problems such as sagging. In order to overcome application difficulties, polymers compatible with the polymerizable monomer and preferably soluble therein have been incorporated in the coating composition, the monomer serving as a non-volatile solvent for the polymer.

The use of polymerizable monomers and monomeric mixtures with linear polymers, such as polymethyl methacrylate, polyvinyl butyral, polyvinyl acetate, ethyl cellulose, cellulose acetate and cellulose nitrate, in coating compositons, impregnants and laminating adhesives is well known. U. S. Patent 2,498,091, issued February 21, 1950, relates to sprayable high solids coating compositions comprising cellulose nitrate, a polyethylene glycol dimethacrylate comonomer mixture and a compatible plasticizer. Such coating compositions are particularly useful on wood where they provide finishes of outstanding quality. These compositions are not entirely satisfactory, however, because the presence of cellulose nitrate necessitates the use of conventional lacquer solvents and diluents which require special safety precautions for handling due to their low flash point. Furthermore, they are relatively expensive. Obviously, changes in composition which either permit elimination of the volatile portion or replacement of costly solvents with low cost volatile solvents and diluents reflect economy in the application of the finish. Since it is impractical to eliminate all the volatile solvents from a sprayable coating composition without sacrifice in the spraying characteristics, desired economy can be best accomplished by the use of low cost volatile solvents and diluents such as hydrocarbons, but unfortunately the latter are not solvents for many organic polymers particularly cellulose esters.

It is an object of this invention to provide improved, high non-volatile content coating compositions characterized by unusual clarity, toughness, flexibility, resistance to marring, scratching and solvent attack, which are dispersed in low cost hydrocarbon solvents. Another object is to provide high non-volatile content coating compositions containing hydrocarbon solvents. Still another object is to provide a coating composition which contains an unusually high concentration of film forming materials at normal spraying consistency. A further object is to provide a coating composition which is curable at low to moderate temperatures.

These and other objects, as will be disclosed as the description of the invention proceeds, are accomplished by the formulation of a liquid coating composition comprising (a) a polymerizable monomer composition consisting of one or more diesters of methacrylic acid and a glycol having the empirical formula

HO—(CH₂—CH₂—O)ₙ—H where $n$ is an integer, (b) coconut oil modified methacrylated alkyd resin, (c) non-drying oil modified mixed polyester of an olefinically unsaturated alpha beta dicarboxylic acid, and (d) a hydrocarbon solvent.

In the drawing, the single figure is a triangular graph showing the operative and preferred ranges of non-volatile content of the blend of the three essential film-forming components in the dry film. The area delineated by the points ABCDE represents the preferred range. The area delineated by the points JKLMN represents the operative area. Points XY and Z correspond to the compositions of Examples I, II and III, respectively.

The bifunctional dimethacrylate esters used in this invention may be prepared by conventional esterification of methacrylic acid with mixtures of glycols having the formula

HO—(CH₂—CH₂—O)ₙ—H where $n$ is an integer, the mixture of glycols having an average molecular weight in the range of 100 to 300. The preparation of the diesters is disclosed in detail in an abandoned application, Serial No. 671,395, filed May 21, 1946, in the names of Anderson and Ramler, with an abstract published in the April 11, 1950, Official Gazette.

The methacrylated alkyd resins may be prepared by conventional procedures. For example, coconut oil is initially reacted with glycerol to form the monoester which is subsequently esterified partially with phthalic anhydride and finally with methacrylic acid in the presence of a polymerization inhibitor. Further details for the preparation of the resin may be found in U. S. Patent 2,190,789, issued February 20, 1940, to Leo P. Hubbuch.

The non-drying oil modified mixed polyesters of olefinically unsaturated alpha beta dicarboxylic acids may be prepared by initially forming the glycerol monoester by ester interchanging a non-drying oil triglyceride with pentaerythritol and subsequently esterifying with excess alpha beta olefinically unsaturated dicarboxylic acid, the said excess being simultaneously esterified with an aliphatic dihydric alcohol, preferably triethylene glycol. Alternately, glycerine, non-drying oil acid and pentaerythritol may be reacted in such proportions to form the monoglyceride and a diester of pentaerythritol and thereafter esterifying with the dicarboxylic acid and the dihydric alcohol.

In the following examples, which illustrate the preferred embodiments, the percentage and part figures are expressed on a weight basis.

Example I

| | Parts |
|---|---|
| Dimethacrylate monomer composition A | 12.0 |
| 48% solution of coconut oil modified methacrylated alkyd—resin #1 | 29.2 |
| 50.5% solution coconut oil modified maleate polyester—resin #2 | 28.0 |
| Cobalt naphthenate solution (6% cobalt) | 1.5 |
| Methyl amyl ketone peroxide catalyst | 0.9 |
| Toluene | 28.4 |
| | 100.0 |

The dimethacrylate monomer composition A was prepared by esterification of methacrylic acid with a mixture of glycols each having the empirical formula

HO—(CH₂CH₂—O)ₙ—H, where $n$ is an integer from 1 to 20, said mixture of glycols having an average molecular weight in the range of 185 to 215.

Resin #1 was a coconut oil modified, methacrylated glyceryl phthalate alkyd resin at 48% non-volatile in a mixture of 91 parts of commercial xylene and 9 parts of high solvency petroleum hydrocarbon having a boiling point range of 130° to 190° C. The solid resin had the following equivalent composition on a weight basis:

| | Per cent |
|---|---|
| Coconut oil | 23 |
| Glyceryl trimethacrylate | 21 |
| Glyceryl triphthalate | 54 |
| Excess glycerine | 2 |
| | 100 |

Resin #2 was a coconut oil modified pentaerythritol/triethylene glycol maleate mixed polyester at 50.5% non-volatile in commercial xylene. The polyester resin had the following equivalent composition on a weight basis:

| | Per cent |
|---|---|
| Coconut oil | 17.15 |
| Pentaerythritol dimaleate | 8.05 |
| Triethylene glycol maleate | 72.85 |
| Excess triethylene glycol | 1.95 |
| | 100.00 |

The final composition of Example I contained 40% non-volatile and consisted of:

| | Per cent |
|---|---|
| Dimethacrylate monomer composition A | 30.0 |
| Coconut oil modified methacrylated alkyd—resin #1 | 35.0 |
| Coconut oil modified maleate mixed polyester—resin #2 | 35.0 |
| | 100.0 |

This composition corresponds to point X on the triangular graph of the drawing, and at 40% solids was sprayable without diluting. A similar composition, except that it was at 50% solids, was also satisfactorily sprayable. The coating composition was applied to mahogany which was previously prepared by sanding, staining, wash coating and filling with conventional wood finishing materials. The polymerizable resinous coating composition of Example I was applied directly over the filler without a sealer as a top coat, allowed to dry for 1 hour at room temperature, and finally cured for 2 hours at 130° F. The film thickness was 4 to 5 mils. The resulting finish was hard, tough, mar-resistant and, in these properties, equalled the quality of a commercially acceptable one derived from a coating composition comprised of 45 parts of dimethacrylate monomer, 45 parts of cellulose nitrate and 10 parts of non-drying oil modified alkyd resin, dispersed in expensive ketone, alcohol and ester solvents, as described in U. S. Patent 2,498,091. It also exhibited excellent flexibility, adhesion and clarity, and it was resistant to organic solvents such as ketones and alcohols. The coating composition was superior to the prior art coating in respect to wetting the substrate and freedom from surface irregularities which appear to be a consequence of poor wetting of the substrate.

*Example II*

| | Per cent |
|---|---|
| Dimethacrylate monomer composition A | 22.5 |
| 48% solution of coconut oil modified methcrylated alkyd—resin #1 | 31.2 |
| 50.5% solution of castor oil modified maleate mixed polyester—resin #3 | 23.8 |
| Cobalt naphthenate solution (6% cobalt) | 1.5 |
| Methyl amyl ketone peroxide catalyst | 0.9 |
| Toluene | 11.6 |
| Xylol | 8.5 |
| | 100.0 |

The monomer composition A and resin #1 were identical with those used in Example I. Resin #3 was a castor oil analogue of resin #2 and was prepared in identical manner except that the coconut oil was replaced with a molar equivalent amount of raw castor oil. Resin #3 had the following equivalent composition on a weight basis:

| | Per cent |
|---|---|
| Castor oil | 23.9 |
| Pentaerythritol dimaleate | 4.1 |
| Triethylene glycol maleate | 70.1 |
| Excess trimethylene glycol | 1.9 |
| | 100.0 |

The non-volatile content of the coating composition represented by Example II consisted of the following:

| | Per cent |
|---|---|
| Dimethacrylate monomer composition A | 45.0 |
| Coconut oil modified methacrylated alkyd—resin #1 | 30.0 |
| Castor oil modified maleate mixed polyester—resin #3 | 25.0 |
| | 100.0 |

This composition corresponds to point Y on the triangular graph of the drawing. As in Example I, this composition containing 50% non-volatile was sprayed on a wood surface and, when cured, yielded a finish which had excellent adhesion, flexibility and solvent resistance; good mar-resistance, clarity, hardness, impact resistance and processing characteristics.

*Example III*

In the following example, in addition to proportion changes, the polymerizable monomer composition A of Example I is replaced by a polymerizable diester of methacrylic acid and triethylene glycol and is referred to as dimethacrylate monomer composition B.

| | Parts |
|---|---|
| Dimethacrylate monomer composition B | 20.0 |
| 48% solution of coconut oil modified methacrylated alkyd—resin #1 | 36.5 |
| 50.5% solution of coconut oil modified maleate mixed polyester—resin #2 | 25.0 |
| Cobalt naphthenate solution | 1.5 |
| Methyl amyl ketone peroxide catalyst | 0.9 |
| Toluene | 11.6 |
| Commercial xylol | 4.5 |
| | 100.0 |

The film-forming content of the above composition represents 50.1% of the total and consists of:

| | Per cent |
|---|---|
| Dimethacrylate monomer composition B | 40 |
| Coconut oil modified methacrylated alkyd—resin #1 | 35 |
| Coconut oil modified maleate mixed polyester—resin #2 | 25 |
| | 100 |

This composition corresponds to point Z on the chart. The composition is sprayed on wood and when cured it exhibits the same high quality and characteristics of the finishes derived from the compositions of Examples I and II.

In the practice of this invention, the polymerizable monomer composition is not limited to monomer composition A which represents a mixture of dimethacrylate esters or the monomer composition B which represents the diester of methacrylic acid and triethylene glycol described respectively in Examples I and III. Methacrylic acid diesters of other polyethylene glycols such as diethylene glycol and tetraethylene glycol, may also be used individually. Mixtures of preformed individual diesters of methacrylic acid and polyethylene glycols may also be used in the practice of this invention. The preferred methacrylic acid diesters of glycols having the empirical formula HO—(CH$_2$—CH$_2$—O)$_n$—H, are either those in which $n$ is an integer in the range of 3 to 5 inclusive or methacrylic acid diesters of mixtures of glycols wherein the proportion of glycols of the stated range predominate although other glycols, wherein $n$ is an integer and varies from 1 to 20, may be present. The preferred molecular weight of the glycol or mixture of glycols is in the range of 150 to 250, although an average molecular weight of 100 to 300 may be used.

Considerable variation in the composition of the mixed polyester is potentially possible since there are five esterifiable reactants present; namely, glycerol, a non-drying oil fatty acid, pentaerythritol, an alpha beta unsaturated dicarboxylic acid and an aliphatic dihydric alcohol. The oil modifier need not be limited to coconut or castor oils as recited in the examples. Other non-drying oils, such as hydrogenated castor oil, cottonseed oil and other saturated fatty acid glycerides, such as, e. g., the glycerides of lauric, palmitic and stearic acid may be used as oil modifiers for the mixed polyester.

The preferred mixed polyester useful in this invention may be broadly defined as a mixed polyester of a non-drying oil fatty acid having 8 to 18 carbon atoms inclusive and an olefinically unsaturated alpha beta dicarboxylic acid, with a mixture of polyhydric alcohols consisting of glycerol, pentaerythritol and a glycol, the glycol being a polymethylene glycol or a polyethylene glycol each having not more than six carbon atoms in the linear chain separating the hydroxyl groups.

The coconut oil modified methacrylated alkyd resin should contain not less than 10% and preferably not more than 25% of coconut oil. The oil modified mixed polyester likewise should contain not less than 10% and preferably not more than 25% of a non-drying oil which may or may not be all or part coconut oil. The minimum amount of coconut oil in the final composition should be not less than 4%. The preferred range of the total amount of coconut oil and other non-drying oil to be incorporated in the final composition is 8 to 16%, however, a range of total non-drying oil content of 4.5 to 20% is useful, both ranges being based on the weight of the non-volatile film-forming components.

The examples show a high solvency petroleum naphtha having a boiling range of 130–190° C., toluene, and xylene as the volatile solvents for the blend of resins. Other aromatic solvents and high solvency petroleum naphthas having a high aromatic content may also be used. Alcohols, esters and ketones are also useful as volatile components of the composition but oxygenated solvents are not essential. One of the advantages of this invention is that useful compositions can be prepared with inexpensive hydrocarbon solvents, thus avoiding the use of more expensive solvents.

In the examples, cobalt naphthenate was used as a catalyst to accelerate the polymerization of the methacrylate diester. Other organic salts of cobalt, such as conventional cobalt driers and cobalt octoate, which are hydrocarbon soluble, may be used in the practice of this invention. Inorganic salts of cobalt, particularly the nitrate, are useful in accelerating the cure of the finish, but lack of solubility in hydrocarbons curtails their use. The inorganic cobalt salts may be used when oxygenated solvents are present in the composition to aid solubility.

The peroxide catalyst is also used to accelerate polymerization. In addition to methyl amyl ketone peroxide cited in the examples, other conventional peroxide catalysts used in vinyl polymerization reactions may be used, including benzoyl peroxide, lauroyl peroxide, tertiary butyl perbenzoate; $\alpha,\alpha'$-azo-diisobutyronitrile; $\alpha,\alpha'$-azobis-$\alpha,\gamma$ dimethylvaleronitrile and benzoin. When desired, polymerization may be accomplished by use of heat, light or ozone in the absence of all or part of the peroxide catalyst.

In Example I the dry film thickness of the composition of this invention is 4 to 5 mils. However, films as thin as 1.0 to 1.5 mils produce desirable finishes. Economic considerations usually control the upper limit of film thickness. The invention is not to be limited to any particular film thickness.

The coating compositions of this invention are particularly adapted for application to wood, but may be applied to other non-metallic substrates or to metal.

A particular feature of the compositions of this invention when applied over wood is the clarity and mar resistance, the beauty of the wood being enhanced and the surface protected at the same time. Where clarity is not required, the composition may contain conventional pigments, organic coloring matter, and extenders.

Other components such as conventional plasticizers, compatible resins and other adjuvants may be present in minor proportion, if desired, but are not essential.

The coating compositions of this invention provide superior finishes characterized by excellent mar resistance, solvent resistance, film clarity, toughness, flexibility, cold distensibility, impact resistance, good adhesion, hardness, sanding properties, and good processing characteristics. The coating composition offers economy in application because it is sprayable at a high non-volatile content and the volatile portion preferably consists of hydrocarbon solvents. In addition to spray application, compositions of this invention may be applied by other conventional means, such as dipping, roller coating and brushing. The use of hydrocarbon solvents provided greater safety in application of the finish than can be attained with the use of conventional lacquer solvents. The coating compositions of this invention cure to durable finishes by polymerization at low temperatures and baking is not necessary, although it can be used where faster drying is desired.

Many widely different embodiments of this invention may be made without departing from the spirit and scope thereof and it is to be understood that the invention is not limited to the specific embodiments disclosed except as defined in the appended claims.

I claim:

1. A coating composition comprising (a) a polymerizable monomer composition consisting of a diester of methacrylic acid and a glycol, said glycol being selected from the group consisting of diethylene glycol, triethylene glycol, tetraethylene glycol, pentaethylene glycol and a mixture of glycols having the empirical formula HO—(CH$_2$—CH$_2$—O)$_n$—H where $n$ is an integer from 1 to 20, said mixture of glycols having an average molecular weight in the range of 100 to 300, (b) a resinous glycerol mixed ester of phthalic, methacrylic and coconut oil acids, the amount of coconut oil acids being present in an amount corresponding to 10% to 25% of coconut oil based on the weight of mixed ester, (c) a mixed polyester of a non-drying oil fatty acid and an olefinically unsaturated dicarboxylic acid, with a mixture of polyhydric alcohols consisting of glycerol, pentaerythritol and a glycol, said glycol being selected from the group consisting of polymethylene glycols and polyethylene glycols, said glycols having not more than 6 carbon atoms in the linear chain separating the hydroxyl groups and (d) a volatile hydrocarbon solvent, said (a), (b) and (c) components being present in amounts represented by the area delineated by points JKLMN of the drawing.

2. The composition of claim 1 in which the proportions of non-volatile film-forming components (a), (b) and (c) are represented by the area delineated by points ABCDE of the drawing.

3. The composition of claim 1 in which the total non-drying oil content of said (b) and (c) components is 4.5 to 20% by weight of the total non-volatile film-forming components.

4. The composition of claim 1 in which the polymerizable monomer composition (a) is the diester of methacrylic acid and triethylene glycol.

5. The composition of claim 1 in which the polymerizable monomer composition (a) is a mixture of methacrylic acid esters of a mixture of glycols having the empirical formula HO—(CH$_2$—CH$_2$—O)$_n$—H here $n$ is an integer from 1 to 20, said mixture of glycols having an average molecular weight in the range of 100 to 300.

6. The composition of claim 1 in which the mixed polyester (c) is a non-drying oil modified mixed polyester of maleic anhydride and contains from 10 to 25% by weight of non-drying oil.

7. The composition of claim 1 in which the mixed polyester (c) is a coconut oil modified mixed polyester of maleic anhydride and contains from 10 to 25% by weight of coconut oil.

8. The composition of claim 1 in which the mixed polyester (c) is a coconut oil modified mixed polyester of fumaric acid and contains from 10 to 25% by weight of coconut oil.

9. The composition of claim 1 in which the mixed polyester (c) is a coconut oil modified mixed polyester of itaconic acid and contains 10 to 25% by weight of coconut oil.

10. The composition of claim 1 in which the mixed polyester (c) is a castor oil modified mixed polyester of maleic anhydride.

11. The composition of claim 1 in which the polymerizable monomer (a) is a diester of methacrylic acid and triethylene glycol, and the mixed polyester (c) is a coconut oil modified mixed polyester of maleic anhydride and contains from 10 to 25% by weight of coconut oil.

12. The composition of claim 1 in which the polymerizable monomer composition (a) is a mixture of methacrylic acid esters of a mixture of glycols having the empirical formula HO—(CH$_2$—CH$_2$—O)$_n$—H where $n$ is an integer from 1 to 20, said mixture of glycols having an average molecular weight in the range of 100 to 300, and the mixed polyester (c) is a coconut oil modified mixed polyester of maleic anhydride and contains from 10 to 25% by weight of coconut oil.

13. The composition of claim 1 in which the mixed polyester (c) is a non-drying oil modified mixed polyester comprising the esterification product of maleic anhydride and triethylene glycol and contains 10 to 25% by weight of non-drying oil, the acid radical of said non-drying oil is a fatty monocarboxylic acid having 8 to 18 carbon atoms.

14. A substrate coated with a composition comprising (a) a polymerizable monomer composition consisting of a diester of methacrylic acid and a glycol, said glycol being selected from the group consisting of diethylene glycol, triethylene glycol, tetraethylene glycol, pentaethylene glycol and a mixture of glycols having the empirical formula HO—(CH$_2$CH$_2$—O)$_n$—H where $n$ is an integer from 1 to 20, said mixture of glycols having an average molecular weight in the range of 100 to 300, (b) a resinous glycerol mixed ester of phthalic, methacrylic and coconut oil acids, the amount of coconut oil acids being present in an amount corresponding to 10% to 25% of coconut oil based on the weight of mixed ester, and (c) a mixed polyester of a non-drying oil fatty acid and an olefinically unsaturated dicarboxylic acid, with a mixture of polyhydric alcohols consisting of glycerol, pentaerythritol and a glycol, said glycol being selected from the group consisting of polymethylene glycols and polyethylene glycols, said glycols having not more than 6 carbon atoms in the linear chain separating the hydroxyl groups, said (a), (b) and (c) components being present in amounts represented by the area delineated by points JKLMN of the drawing.

15. The product of claim 14 in which the substrate is wood.

16. The product of claim 14 in which the substrate is metal.

References Cited in the file of this patent

UNITED STATES PATENTS

| | | |
|---|---|---|
| 2,129,722 | Woodhouse | Sept. 13, 1938 |
| 2,190,789 | Hubbuch | Feb. 20, 1940 |
| 2,498,091 | Moffett | Feb. 21, 1950 |